(12) United States Patent  
Asmis

(10) Patent No.: US 8,828,127 B2
(45) Date of Patent: Sep. 9, 2014

(54) SYSTEM AND METHOD FOR CONTROLLING REGENERATION OF AN AIR DRYER

(75) Inventor: Nicholas A. Asmis, Seven Hills, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 204 days.

(21) Appl. No.: 13/359,029

(22) Filed: Jan. 26, 2012

(65) Prior Publication Data

US 2013/0192464 A1    Aug. 1, 2013

(51) Int. Cl.
B01D 53/02    (2006.01)

(52) U.S. Cl.
USPC ............... 96/109; 96/111; 96/113; 96/114; 96/115; 95/1; 95/8; 95/10; 95/11; 95/19; 95/21; 95/117; 95/148; 55/DIG. 17; 34/80; 34/472; 34/473

(58) Field of Classification Search
USPC .......... 96/109, 111, 113–115; 95/1, 8, 10, 11, 95/19, 21, 117, 148; 55/DIG. 17; 34/80, 34/472, 473
See application file for complete search history.

(56) References Cited

U.S. PATENT DOCUMENTS

| 5,553,661 | A | 9/1996 | Beyerlein et al. |
| 6,298,911 | B1 | 10/2001 | Volz et al. |
| 7,608,132 | B2 | 10/2009 | Fornof et al. |
| 2009/0049983 | A1 | 2/2009 | Thelen |
| 2009/0150036 | A1 | 6/2009 | Craig |
| 2010/0174451 | A1 | 7/2010 | Leinung |
| 2010/0331143 | A1 | 12/2010 | Jager et al. |
| 2011/0259189 | A1 | 10/2011 | Diekmeyer et al. |

FOREIGN PATENT DOCUMENTS

| DE | 102008056322 A1 | 5/2010 |
| EP | 2151362 | 2/2010 |
| WO | 2009010199 A1 | 1/2009 |
| WO | WO2010051868 | 5/2010 |

OTHER PUBLICATIONS

International Search Report for related PCT Patent Application No. PCT/US2013/0022742, mailed Apr. 29, 2013.
Written Opinion for related PCT Patent Application No. PCT/US2013/0022742, mailed Apr. 29, 2013.

Primary Examiner — Christopher P Jones
(74) Attorney, Agent, or Firm — Calfee, Halter & Griswold LLC

(57) ABSTRACT

A regeneration controller for an air dryer on a vehicle includes a location identifier that determines a current location, a regeneration profile identifier that selects a regeneration profile based on the current location, and a regeneration initiator that initiates regenerations of the air dryer based on the regeneration profile.

22 Claims, 4 Drawing Sheets

SYSTEM AND METHOD FOR CONTROLLING REGENERATION OF AN AIR DRYER

BACKGROUND

The present invention relates to air dryers on heavy vehicles. It finds particular application in conjunction with selecting a regeneration profile and will be described with particular reference thereto. It will be appreciated, however, that the invention is also amenable to other applications.

Heavy vehicles typically use compressed air for operating various vehicle systems (e.g., braking systems). Air dryers are commonly included in compressed air systems for removing moisture and contaminants from the compressed air before the compressed air is stored in reservoirs and/or used for the various vehicle systems. To ensure reliable operation, the air dryers are periodically regenerated. During a regeneration cycle, previously dried and cleaned compressed air is returned through a regenerative media (e.g., a desiccant) to remove moisture and other contaminants that accumulated on the desiccant since prior regeneration cycles.

Conventionally, the time between regeneration cycles is determined based on one or more parameters such as, for example, the time since the most recent regeneration cycle was completed, an amount of moisture and/or contaminants in the regeneration media, and/or pressure levels in the respective reservoirs, etc.

The present invention provides a new and improved apparatus and method for controlling regeneration of an air dryer.

SUMMARY

In one aspect of the present invention, it is contemplated that a regeneration controller for an air dryer on a vehicle includes a location identifier that determines a current location, a regeneration profile identifier that selects a regeneration profile based on the current location, and a regeneration initiator that initiates regenerations of the air dryer based on the regeneration profile.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to exemplify the embodiments of this invention.

DETAILED DESCRIPTION OF ILLUSTRATED EMBODIMENT

Figure 1:
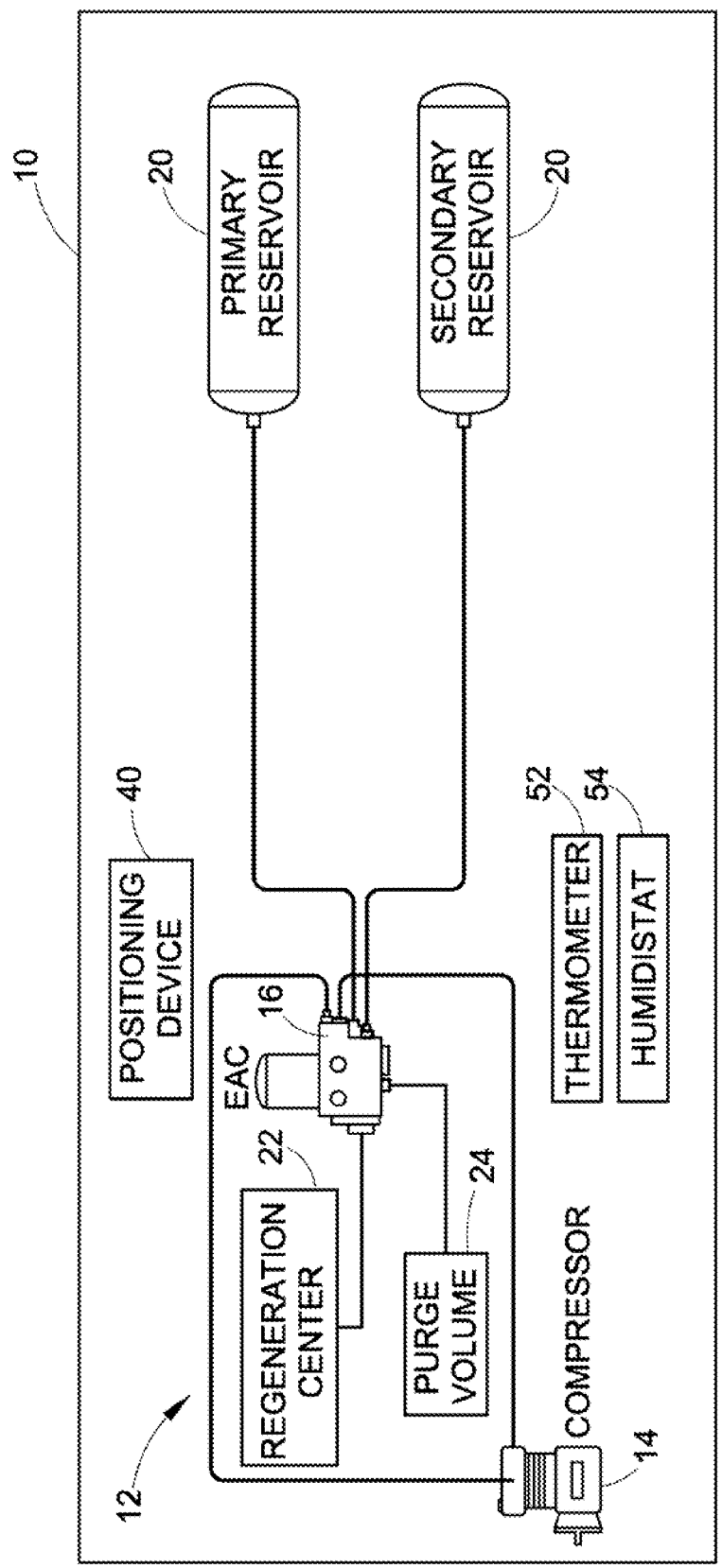
FIG. 1 illustrates a schematic representation of a vehicle including a regeneration controller in accordance with one embodiment of an apparatus illustrating principles of the present invention.

With reference to FIG. 1, a simplified component diagram of a vehicle 10 including an exemplary air dryer system 12 is illustrated in accordance with one embodiment of the present invention. The system 12 includes a compressor 14, an air dryer 16, at least one reservoir 20, and a regeneration controller 22. A purge volume 24 fluidly communicates with the air dryer 16 and stores air used to regenerate the air dryer 16 during regeneration cycles. In the illustrated embodiment, the purge volume 24 is an external purge volume.

Figure 2:
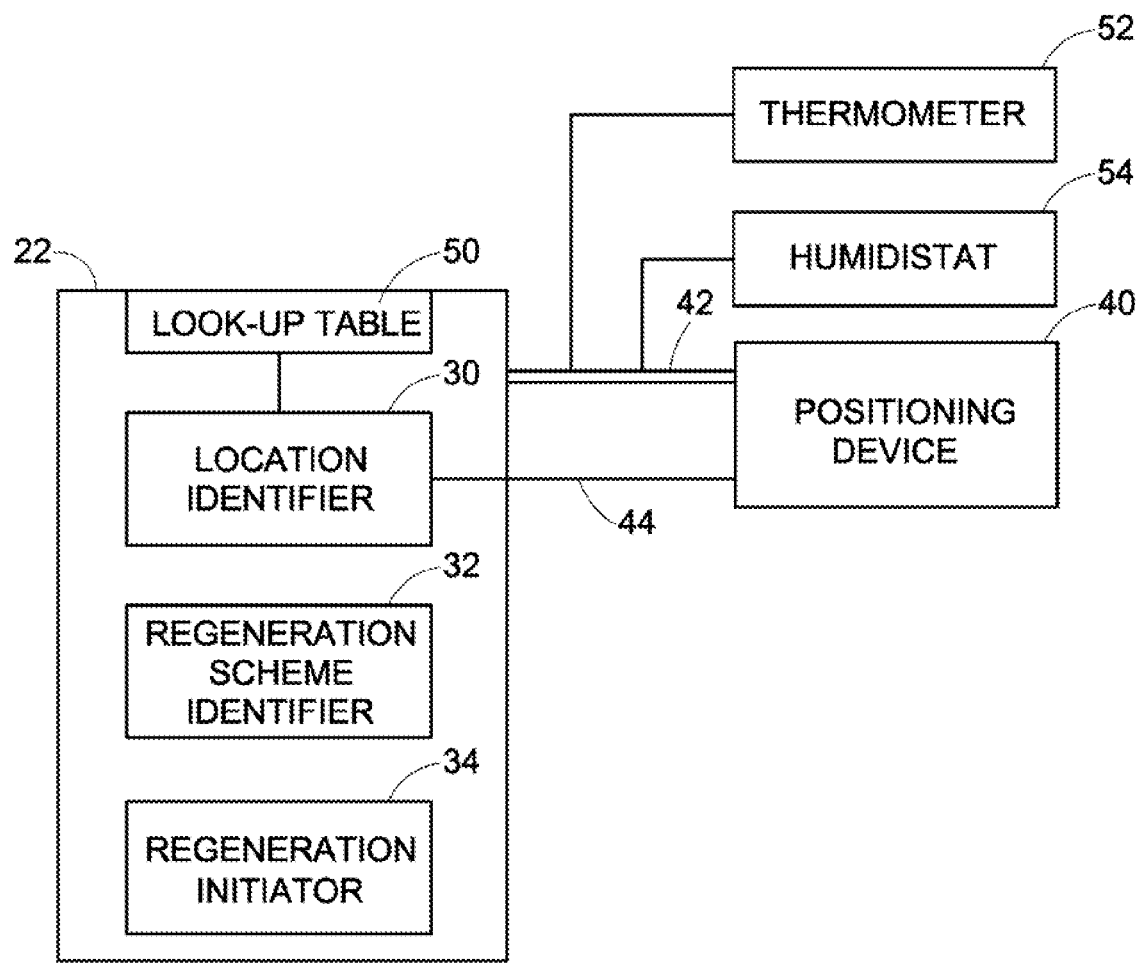
FIG. 2 illustrates a schematic representation of the regeneration controller in accordance with one embodiment of an apparatus illustrating principles of the present invention.

With reference to FIG. 2, the regeneration controller 22 includes a location identifier 30, a regeneration profile identifier 32, and a regeneration initiator 34. The location identifier 30 determines a current location of the vehicle 10. The regeneration profile identifier 32 selects a regeneration profile based on the current location of the vehicle 10. The regeneration initiator 34 initiates regenerations of the air dryer 16 based on the regeneration profile.

In one embodiment, the location identifier 30 receives a location signal from a positioning device 40 on the vehicle 10. It is contemplated that the positioning device 40 is a global positioning device (GPS) that determines a latitude and a longitude, and optionally an altitude, of the vehicle 10 from satellite-based signals. Alternatively, it is also contemplated that the positioning device 40 determines a latitude and a longitude, and optionally an altitude, of the vehicle 10 from land-based signals (e.g., cellular triangulation). The positioning device 40 is a means for determining a current location of the vehicle. Location signal(s) from the positioning device 40 are transmitted to the location identifier 30. The location identifier 30 determines the current location of the vehicle 10 based on the location signal(s). In the illustrated embodiment, both the location identifier 30 and the positioning device 40 are electronically connected to a vehicle communication bus 42. In this embodiment, the location signal(s) are transmitted from the positioning device 40 to the regeneration controller 22 (and the location identifier 30) via the communication bus 42. Alternatively, the location identifier 30 is directly electronically connected to the positioning device 40 via a direct electronic connection 44 so that the location signal(s) are transmitted from the positioning device 40 directly to the location identifier 30. Although the location identifier 30 is illustrated as electronically connected to the positioning device 40 via both the vehicle communication bus 42 and the direct electronic connection 44, it is contemplated that during use the location identifier 30 is electronically connected to the positioning device 40 via either the vehicle communication bus 42 or the direct electronic connection 44.

The location identifier 30 determines one of a plurality of location zones (e.g., geographic zones) based on the current location. For example, with reference to FIG. 3, different regions of the United States are assigned a respective one of a plurality (e.g., eight (8)) location zones. Using a United States map 46 in the illustrated example, the southeast region of the US is assigned as Zone #1, the southwest region of the US is assigned as Zone #2, the northwest region of the US is assigned as Zone #3, the upper Great Lakes region of the US is assigned as Zone #4, the far upper east region of the US is assigned as Zone #5, the State of Alaska is assigned as Zone #6, the State of Hawaii is assigned as Zone #7, and the remainder of the US is assigned as Zone #0. The Zones #0-7 correspond to the #0-7 in the map 46. In one embodiment, it is contemplated that the Zone #0 is the remaining portions of the US not included in any of the other zones.

Although the location zones have been described above as relative geographic areas of the US, it is also contemplated that each of the location zones is defined based on at least one of historical, average, and future estimated weather patterns. For example, Zone #1 is defined as relatively hot and humid historical weather patterns, Zone #2 is defined as relatively hot and dry historical weather patterns, and Zone #0 is defined as relatively moderate historical weather patterns. When looking at pre-programmed or stored lookup tables, the one embodiment of the invention may utilize some averaging or other data mining of officially recorded environmental data tabulated and sorted by various departments and agencies of the United States Federal government. Specific sub-sources such as the National Weather Service (http://weather.gov/), National Climatic Data Center (http://www.ncdc.noaa.gov/oa/ncdc.html) may, for example, be used to generate data to be used as part of the analysis. Alternatively, predicted weather patterns based on sources such as the Farmer's Almanac may be used to generate static tables for use by the invention. An alternate embodiment could utilize a real-time update profile whereby local weather predictions could be "pushed" to the vehicle controller via a Wi-Fi, cellular, or other method that constitutes two-way communication between the vehicle and some central source.

Figure 3:
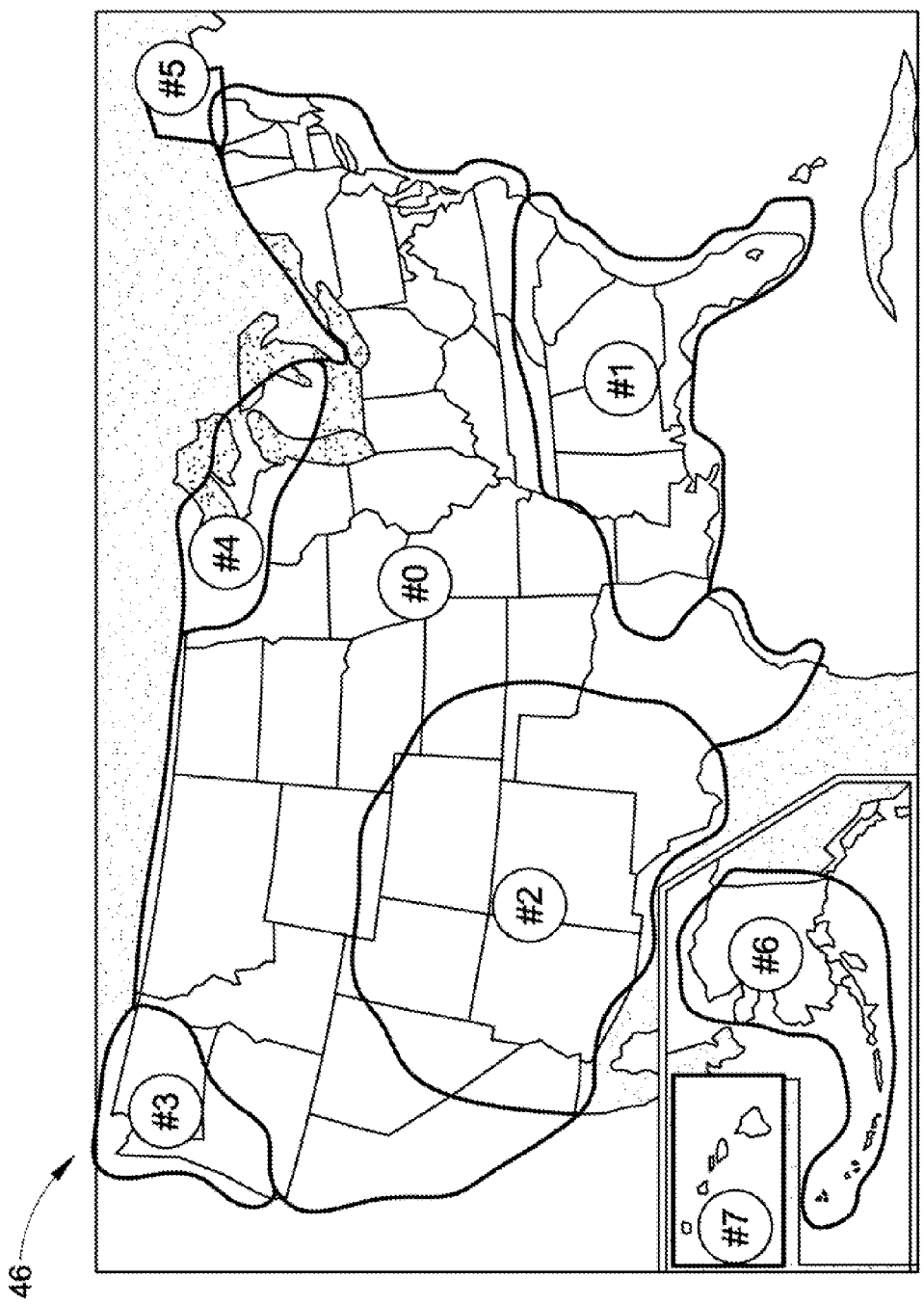
FIG. 3 illustrates a map including various location zones in accordance with one embodiment of an apparatus illustrating principles of the present invention.

With reference to FIGS. 1-3, in one embodiment, it is contemplated that the location identifier 30 determines the current location of the vehicle 10 based on a latitude and longitude. For example, the location identifier 30 receives the latitude and longitude from the positioning device 40. The location identifier 30 accesses a look-up table 50, which associates latitudes and longitudes with the respective location zones. For example, the latitude and longitude received from the positioning device 40 is transmitted by the location identifier 30 to the look-up table 50. In response, the look-up table 50 transmits a signal back to the location identifier 30 indicating the location zone. In a more specific example, if the location identifier 30 receives a signal including a latitude and a longitude of the vehicle for somewhere in Florida from the positioning device 40, the location identifier 30 transmits a signal to the look-up table 50 received from the positioning device 40. The look-up table 50 then selects (e.g., determines) the latitude and longitude are associated with the Zone #1 and transmits a signal back to the location identifier 30 identifying that location zone.

As discussed above, the regeneration profile identifier 32 selects the regeneration profile based on the current location. It is contemplated that the regeneration profile identifier 32 selects one of a plurality (e.g., three (3)) profiles based on the location zone identified by the location identifier 30. In this case, multiple zones can be grouped together and associated with a single regeneration profile. For example, Zones #1, 3, 4, 5, and 7 may be associated with a "Humid" profile; Zone #2 may be associated with a "Dry" profile; and Zone #0 may be associated with a "Moderate" profile. Obviously, the number of profiles could be increased up to (or even above) the number of location zones. However, the eight (8) location zones and three (3) profiles discussed above will be used for purposes of explanation.

It is contemplated that the "Moderate" profile is a "standard" profile. For example, the "Moderate" (standard) profile may be the profile included commonly included in heavy vehicles in the United States.

Optionally, the current location includes not only the latitude and longitude, but also the altitude of the vehicle 10.

In one embodiment, it is contemplated that the system 12 is part of a logic-loop timer that governs an electronic controller on the air dryer 16. A current state is a loop time of approximately 5 ms. In this interval, the controller refreshes a value for the vehicle's current location and compares to a registered value of the previous view and adjusts accordingly based on the lookup table, etc.

Alternatively, the invention may easily be tied into a key-on condition whereby a new location value is determined based on the wakeup events of the electronic controller as the vehicle ignition is started.

In the embodiment discussed above, if the location identifier 30 determines the vehicle 10 is in the State of Florida (e.g., a relatively more humid location), the location identifier 30 determines the vehicle 10 is in Zone #1 of the US. Therefore, the regeneration profile identifier 32 selects the Humid profile is to be used for the vehicle 10. If the location identifier 30 determines the vehicle 10 is in the State of Arizona (e.g., a relatively dryer location), the location identifier 30 determines the vehicle 10 is in Zone #2 of the US; in this case, the regeneration profile identifier 32 selects the Dry profile is to be used for the vehicle 10. If the location identifier 30 determines the vehicle 10 is in the State of Kentucky (e.g., a relatively moderate location), the location identifier 30 determines the vehicle 10 is in Zone #0 of the US; in this case, the regeneration profile identifier 32 selects the Moderate profile is to be used for the vehicle 10.

In another embodiment, it is also contemplated that the regeneration profile identifier 32 selects the regeneration profile based on the current location, which in this embodiment includes the altitude of the vehicle 10. For example, if the latitude and longitude of the vehicle 10 call for Zone #1 to be selected, conditions at higher altitudes may warrant the "Moderate" profile be selected instead of the "Wet" profile, which would typically be selected for Zone #1.

In another embodiment, it is also contemplated that the regeneration profile identifier 32 selects the regeneration profile based on the current location zone and an ambient temperature and/or humidity outside of the vehicle 10. In this embodiment, a thermometer 52 and/or humidistat 54 is/are electronically connected to the regeneration profile identifier 32 via, for example, the vehicle communication bus 42. Alternatively, like the positioning device 40 is directly electronically connected to the location identifier 30, it is also contemplated that the thermometer 52 and/or humidistat 54 is/are directly electronically connected to the regeneration profile identifier 32 (although this/these direct electronic connection is/are not illustrated). In this embodiment, for example, if the location identifier 30 determines the vehicle 10 is in Zone #1 (e.g., the vehicle 10 is in the State of Florida), but the thermometer 52 and/or humidistat 54 indicate(s) the ambient conditions outside the vehicle 10 are unusually moderate and/or dry, the regeneration profile identifier 32 may select the "Moderate" profile instead of the "Humid" profile.

In another embodiment, it is also contemplated that the regeneration profile identifier 32 selects the regeneration profile based on the current location zone, the ambient temperature and/or humidity outside of the vehicle 10, and/or the day of the year (e.g., the season of the year). In this embodiment, the regeneration profile identifier 32 includes (or is electronically connected to another component that includes) a calendar function that identifies the day (and season) of the year. In this embodiment, for example, if the location identifier 30 determines the vehicle 10 is in Zone #1 (e.g., the vehicle 10 is in the State of Florida), but the thermometer 52 and/or humidistat 54 indicate(s) the ambient conditions outside the vehicle 10 are unusually moderate and/or dry and/or the clock indicates the current day (or season) of the year is typically relatively more moderate, the regeneration profile identifier 32 may select the "Moderate" profile instead of the "Humid" profile.

It is contemplated that the frequency and/or duration of the regenerations are determined based on the selected profile. For example, if the regeneration profile identifier 32 selects the Humid profile is to be used (if the vehicle 10 is in Zone #1 of the US, for example), the regeneration initiator 34 initiates regeneration cycles of the air dryer 16 relatively more frequently than if the regeneration profile identifier 32 selects either the Dry profile (if the vehicle 10 is in Zone #2 of the US, for example) or the Moderate profile (if the vehicle 10 is in Zone #0 of the US, for example).

The regeneration cycles of the air dryer are controlled based on the regeneration profile. In one embodiment, the regeneration initiator 34 monitors the amount of air that is treated by the air dryer 16 since the most recent regeneration cycle. In this embodiment, if the regeneration profile identifier 32 selects a current profile as the Humid profile (associated with the Zone #1), the regeneration initiator 34 may cause the air dryer 16 to regenerate more frequently than if the regeneration profile identifier 32 selects the current profile to the Moderate profile (associated with the Zone #0) or the Dry profile (associated with Zone #2). For example, the regeneration initiator 34 may cause the air dryer 16 to regenerate relatively more frequently by initiating regenerations after a relatively smaller amount of air is treated or after a shorter period of time since the most recent regeneration. In an alternate embodiment, the regeneration initiator 34 may cause the air dryer 16 to regenerate relatively more frequently by shortening the time of each of the regeneration cycles. Alternatively, the regeneration initiator 34 may cause the air dryer 16 to regenerate relatively less frequently by initiating regenerations after a relatively larger amount of air is treated. In an alternate embodiment, the regeneration initiator 34 may cause the air dryer 16 to regenerate relatively less frequently by lengthening the time of each of the regeneration cycles.

Figure 4:
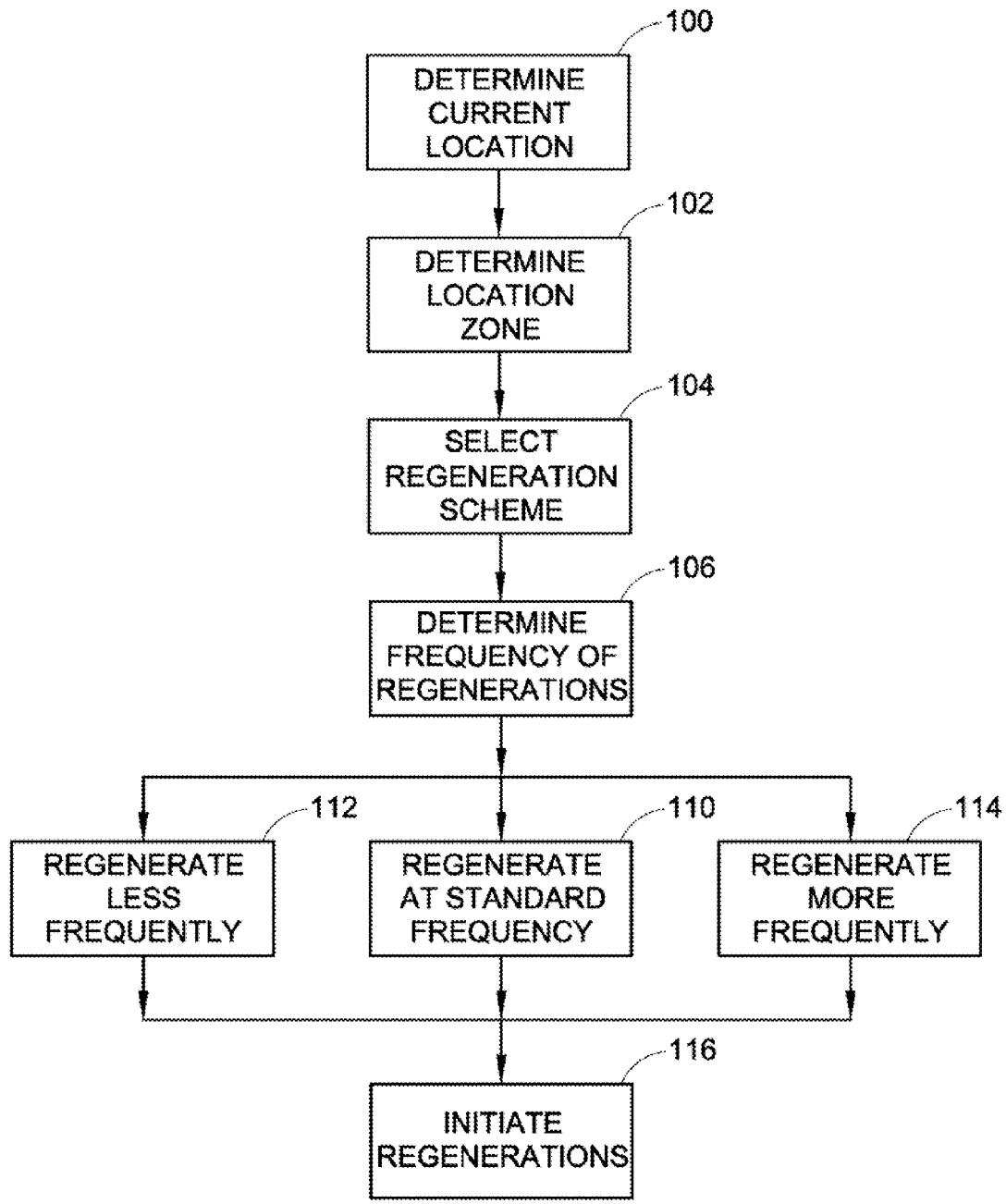
FIG. 4 is an exemplary methodology of controlling regenerations of a vehicle air dryer via the regeneration controller in accordance with one embodiment illustrating principles of the present invention.

With reference to FIG. 4, an exemplary methodology of the system shown in FIGS. 1-3 for controlling regeneration of the air dryer 16 via the regeneration controller 22 is illustrated. As illustrated, the blocks represent functions, actions and/or events performed therein. It will be appreciated that electronic and software systems involve dynamic and flexible processes such that the illustrated blocks and described sequences can be performed in a different order. It will also be appreciated by one of ordinary skill in the art that elements embodied as software may be implemented using various programming approaches such as machine language, procedural, object-oriented or artificial intelligence techniques. It will further be appreciated that, if desired and appropriate, some or all of the software can be embodied as part of a device's operating system.

In a Step 100, a current location of the vehicle is determined. As discussed above, the location identifier 30 determines the position of the vehicle 10 based on signals received from the positioning device 40. For example, the signals are received by the location identifier 30 via the vehicle communication bus 42 or a direct electronic connection 44 from the positioning device 40.

The location zone is determined, in a Step 102, based on the current location.

The regeneration profile is selected in a Step 104. The regeneration profile is selected as discussed above. For example, the regeneration profile is selected based on the current location and the location zone. In other embodiments, the regeneration profile is also selected based on the ambient temperature, the ambient humidity, and/or the altitude.

In a Step 106, a determination is made whether to initiate regenerations of the air dryer 16 relatively more frequently, relatively less frequently, or at the same frequency as compared to the standard regeneration profile. As discussed above, in one embodiment, it is contemplated that the "Moderate" profile is a "standard" regeneration profile.

If the "Moderate" profile is selected in the Step 104, control passes to a Step 110 to cause the regeneration initiator 34 to cause the air dryer 16 to regenerate at the standard frequency. For example, the regeneration profile identifier 32 may transmit a signal to the regeneration initiator 34 to set the regeneration initiator 34 into a "Moderate" mode, which causes the same frequency of regenerations as the "Moderate" (e.g., standard) profile.

If the "Dry" profile is selected in the Step 104, control passes to a Step 112 to cause the regeneration initiator 34 to cause the air dryer 16 to regenerate relatively less frequently than the "Moderate" (e.g., standard). For example, the regeneration profile identifier 32 may transmit a signal to the regeneration initiator 34 to set the regeneration initiator 34 into a "Dry" mode, which causes relatively less frequent regenerations relative to the "Moderate" (e.g., standard) profile.

If the "Humid" profile is selected in the Step 104, control passes to a Step 114 to cause the regeneration initiator 34 to cause the air dryer 16 to regenerate relatively more frequently than the "Moderate" (e.g., standard). For example, the regeneration profile identifier 32 may transmit a signal to the regeneration initiator 34 to set the regeneration initiator 34 into a "Humid" mode, which causes relatively more frequent regenerations relative to the "Moderate" (e.g., standard) profile.

The regenerations of the air dryer are initiated in a Step 116 according to the selected regeneration profile.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

I claim:

1. A regeneration controller for an air dryer on a vehicle, comprising:
   a location identifier that determines a current location of the vehicle and a current location zone based on the current location;
   a regeneration profile identifier that selects a regeneration profile based on the current location zone and at least one of an ambient temperature and an ambient humidity; and
   a regeneration initiator that initiates regenerations of the air dryer based on the regeneration profile.

2. The regeneration controller as set forth in claim 1, wherein
   the location identifier determines the current location zone from one of a plurality of location zones.

3. The regeneration controller as set forth in claim 2, wherein:
   the zones are defined based on at least one of historical, average, and future estimated weather patterns.

4. The regeneration controller as set forth in claim 1, wherein the regeneration profile identifier determines the regeneration profile to be one of at least three profiles, including:
   a dry profile;
   a moderate profile; and
   a humid profile.

5. The regeneration controller as set forth in claim 1, wherein:

the regeneration initiator initiates the regenerations of the air dryer relatively more frequently when the current location causes the regeneration profile identifier to select a profile associated with a relatively more humid location zone.

6. The regeneration controller as set forth in claim 1, wherein:
when the selected profile is associated with a relatively more humid location zone, the regeneration initiator initiates the regenerations of the air dryer relatively more frequently by initiating regenerations after relatively less air is dried by the air dryer.

7. The regeneration controller as set forth in claim 1, wherein:
the location identifier accesses a look-up table to select the location zone based on the current location.

8. The regeneration controller as set forth in claim 1, wherein:
the regeneration profile identifier also selects the regeneration profile based on a season of the year.

9. The regeneration controller as set forth in claim 1, wherein:
the regeneration profile identifier also the regeneration profile based on an altitude.

10. The regeneration controller as set forth in claim 1, wherein:
the location identifier determines the current location based on a location signal received from a positioning device on the vehicle.

11. The regeneration controller as set forth in claim 10, wherein:
the location identifier receives the location signal from the positioning device via a vehicle communication bus.

12. The regeneration controller as set forth in claim 10, wherein:
the positioning device, on the vehicle determines a latitude and a longitude, and optionally an altitude, of the vehicle from at least one of satellite-based signals and land-based signals.

13. A regeneration controller for an air dryer on a vehicle, comprising:
means for determining a current location of the vehicle and a current location zone based on the current location of the vehicle;
a regeneration profile identifier that selects a regeneration profile based on the current location zone and at least one of an ambient temperature and an ambient humidity; and
a regeneration initiator that initiates regenerations of the air dryer based on the regeneration profile.

14. The regeneration controller as set forth in claim 13, wherein the means for determining a current location of the vehicle includes:
a positioning device on the vehicle that transmits a position signal to the regeneration profile identifier.

15. The regeneration controller as set forth in claim 14, wherein:
the positioning device transmits the position signal to the regeneration profile identifier via a communication bus.

16. The regeneration controller as set forth in claim 14, wherein:
the positioning device communicates with the regeneration profile identifier via a direct electronic connection; and
the positioning device transmits the position signal to the regeneration profile identifier via the direct electronic connection.

17. The regeneration controller as set forth in claim 13, wherein
the location identifier determines the current location zone from one of a plurality of location zones; and
the regeneration profile identifier selects the regeneration profile from a plurality of regeneration profiles based on the determined location zone.

18. The regeneration controller as set forth in claim 17, wherein a frequency at which the regeneration initiator initiates the regenerations is based on the selected regeneration profile.

19. An air dryer system on a vehicle, the system including:
an air dryer; and
a regeneration controller for controlling regeneration cycles of the air dryer, the regeneration controller comprising:
a location identifier that determines a current location of the vehicle and a current location zone based on the current location;
a regeneration profile identifier that selects a regeneration profile based on the current location zone and at least one of an ambient temperature and an ambient humidity; and
a regeneration initiator that initiates regenerations of the air dryer based on the regeneration profile.

20. The air dryer system as set forth in claim 19, further including:
a purge volume storing air used to regenerate the air dryer during the regenerations.

21. The air dryer system as set forth in claim 20, wherein:
the location identifier determines the current location zone from one of a plurality of location zones.

22. The air dryer system as set forth in claim 19, wherein:
a frequency at which the regeneration initiator initiates the regenerations is based on the current location zone.

* * * * *